United States Patent [19]

Trautwein

[11] 4,088,199
[45] May 9, 1978

[54] STABILIZED THREE-WHEELED VEHICLE

[76] Inventor: Wolfgang Trautwein, 4502 Choctaw Cir., Huntsville, Ala. 35801

[21] Appl. No.: 769,946

[22] Filed: Feb. 18, 1977

Related U.S. Application Data

[63] Continuation-in-part of Ser. No. 660,729, Feb. 23, 1976, Pat. No. 4,020,914.

[51] Int. Cl.$^2$ ............................................. B62D 61/06
[52] U.S. Cl. ................................... 180/25 R; 180/41; 280/112 A; 280/269
[58] Field of Search .................. 180/25 R, 41, 9.24 A; 280/62, 112 A, 269

[56] References Cited

U.S. PATENT DOCUMENTS

| 2,920,636 | 1/1960 | Gassner | 280/41 X |
| 3,561,778 | 2/1971 | La Brie | 280/269 X |
| 3,572,456 | 3/1971 | Healy | 180/25 R X |
| 3,583,507 | 6/1971 | Trautwein | 180/9.24 A X |
| 3,746,118 | 7/1973 | Altorfer | 180/25 R |
| 3,964,563 | 6/1976 | Allen | 180/27 |
| 4,020,914 | 5/1977 | Trautwein | 180/25 R |

FOREIGN PATENT DOCUMENTS

| 1,063,473 | 8/1959 | Germany | 280/112 A |
| 599,680 | 11/1959 | Italy. | |

Primary Examiner—Robert R. Song
Assistant Examiner—Terrance L. Siemens
Attorney, Agent, or Firm—C. A. Phillips

[57] ABSTRACT

A three-wheeled motorcycle in which two front wheels are interconnected with a conventional motorcycle frame by a parallelogram configured coupling assembly utilizing a pair of cross members pivotally connecting hubs of the front wheels and pivotally connected to the frame. Foot resting platforms are positioned on either side of the motorcycle, being fixedly connected to one of the cross members in the front which is pivotally connected to the motorcycle frame.

14 Claims, 9 Drawing Figures

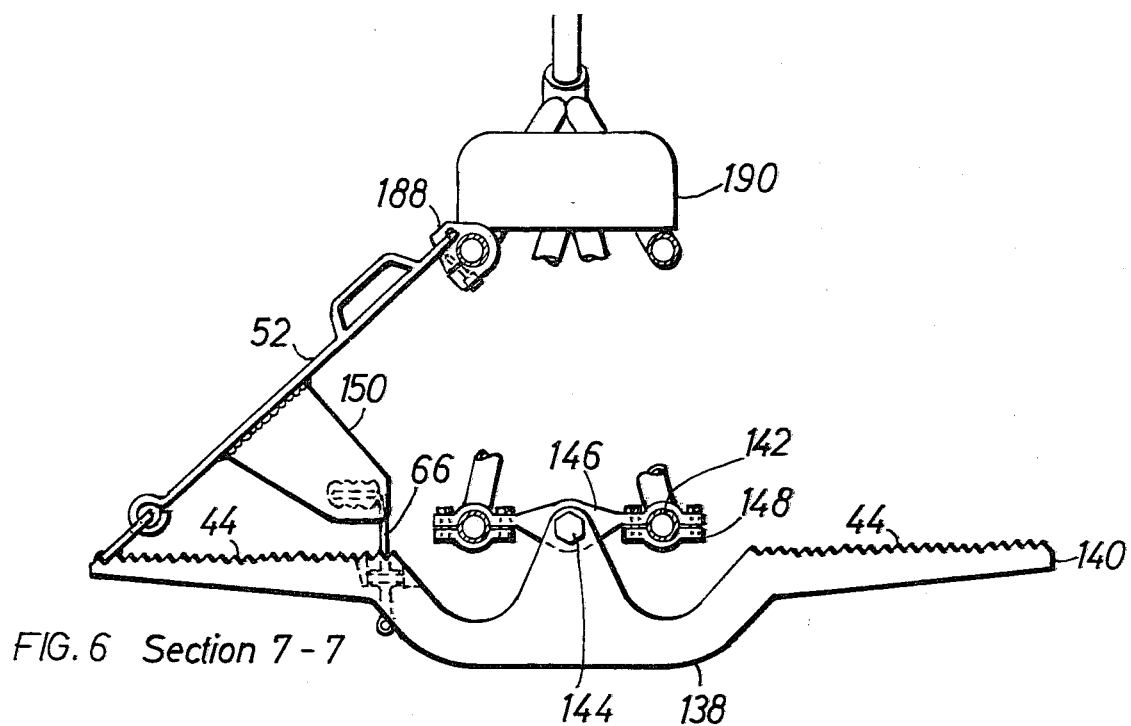
FIG. 6 Section 7-7
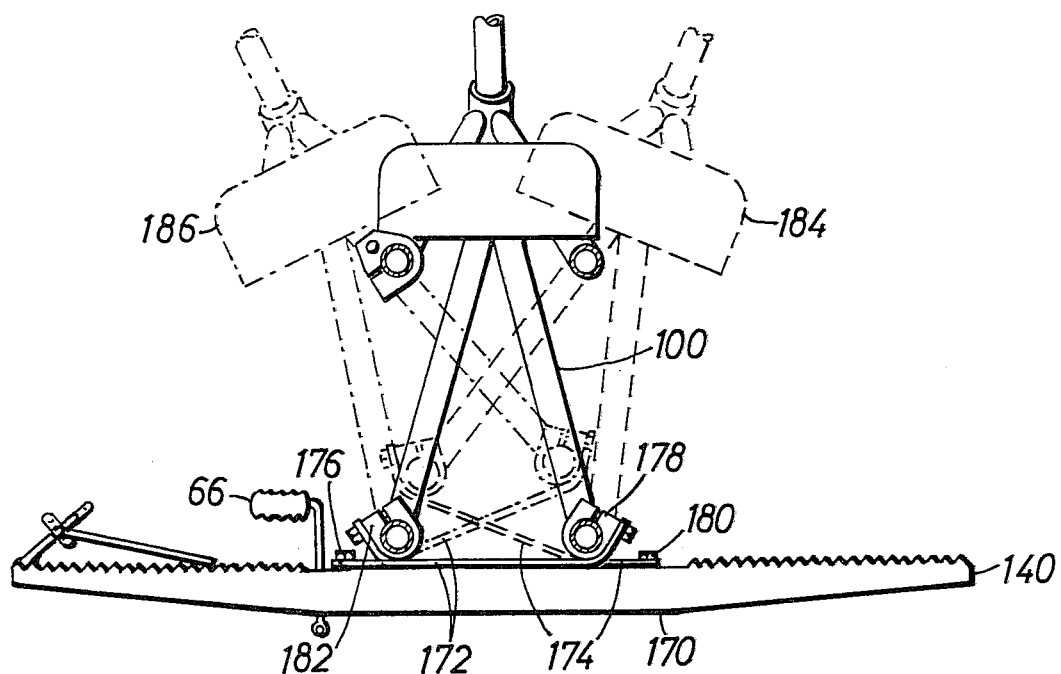
FIG. 7

STABILIZED THREE-WHEELED VEHICLE

This patent application is a continuation-in-part application of patent application bearing Ser. No. 660,729, filed Feb. 23, 1976, now U.S. Pat. No. 4020914.

BACKGROUND OF THE INVENTION

1. Field of the Invention

This invention relates to motorcycles, and particularly to three-wheeled motorcycles.

2. General Description of the Prior Art

While the greater economy achievable by the use of the motorcycle as a basic form of transportation in place of the automobile is widely recognized, there has been a general lack of acceptance of it for this role because of the hazards associated with its operation. Most motorcycles have two wheels, and this causes a much less stable engagement with the road than achievable with a vehicle with three or four wheels. While motorcycles have been constructed with three wheels, typically by adding a rear mounted side car to which is attached a third wheel, this arrangement has not been too satisfactory, particularly because of the asymmetric load and handling characteristics. In recognition of this problem, the applicant previously invented and obtained German Pat. No. 1,063,473 on an improved symmetrically configured three-wheeled motorcycle in which the frame of the vehicle could be banked in unison with all of the wheels. However, there still remained a problem of stability and a sense of insecurity which the applicant believes has slowed the acceptance of threewheeled motorcycles as safe vehicles. A recently introduced three-wheeled vehicle employs operator controlled actuators for banking. The addition of such controls adds complexity and, of course, costs to the vehicle. More importantly, however, there is a time lag between the operation of the controls and a response by the actuators, and this introduces new hazards if banking commands are not precisely timed.

Accordingly, it is an object of this invention to provide an improved three-wheeled motorcycle without the need for powered actuators or additional vehicle controls which is a more stable vehicle with demonstrably enhanced safety of operation.

It is a further object of this invention to provide a three-wheeled vehicle which is both safe and comfortable in operation in all types of weather.

SUMMARY OF THE INVENTION

In accordance with this invention, either a three-wheeled motorcycle would be originally constructed, or a conventional two-wheeled motorcycle would be modified to provide a three-wheeled vehicle wherein two front wheels are coupled to the motorcycle frame by means of a parallelogram-type wheel support assembly. Foot rests attach to this assembly and extend rearward along each side of the frame. Thus, the rider, who sits on a seat on the frame, may apply a relative force between the frame and the platform, and thereby to the parallelogram coupling assembly, to effect a desired banking, or upright, posture for the operator and the frame while maintaining all three wheels at essentially the same angle with respect to the ground.

BRIEF DESCRIPTION OF THE DRAWINGS

FIG. 6 is a view taken along lines 7—7 of FIG. 4, looking forward.

FIG. 7 is a sectional view as it would appear along lines 7—7 of FIG. 4 with a modified platform mounting.

DETAILED DESCRIPTION OF THE DRAWINGS

Figure 1:
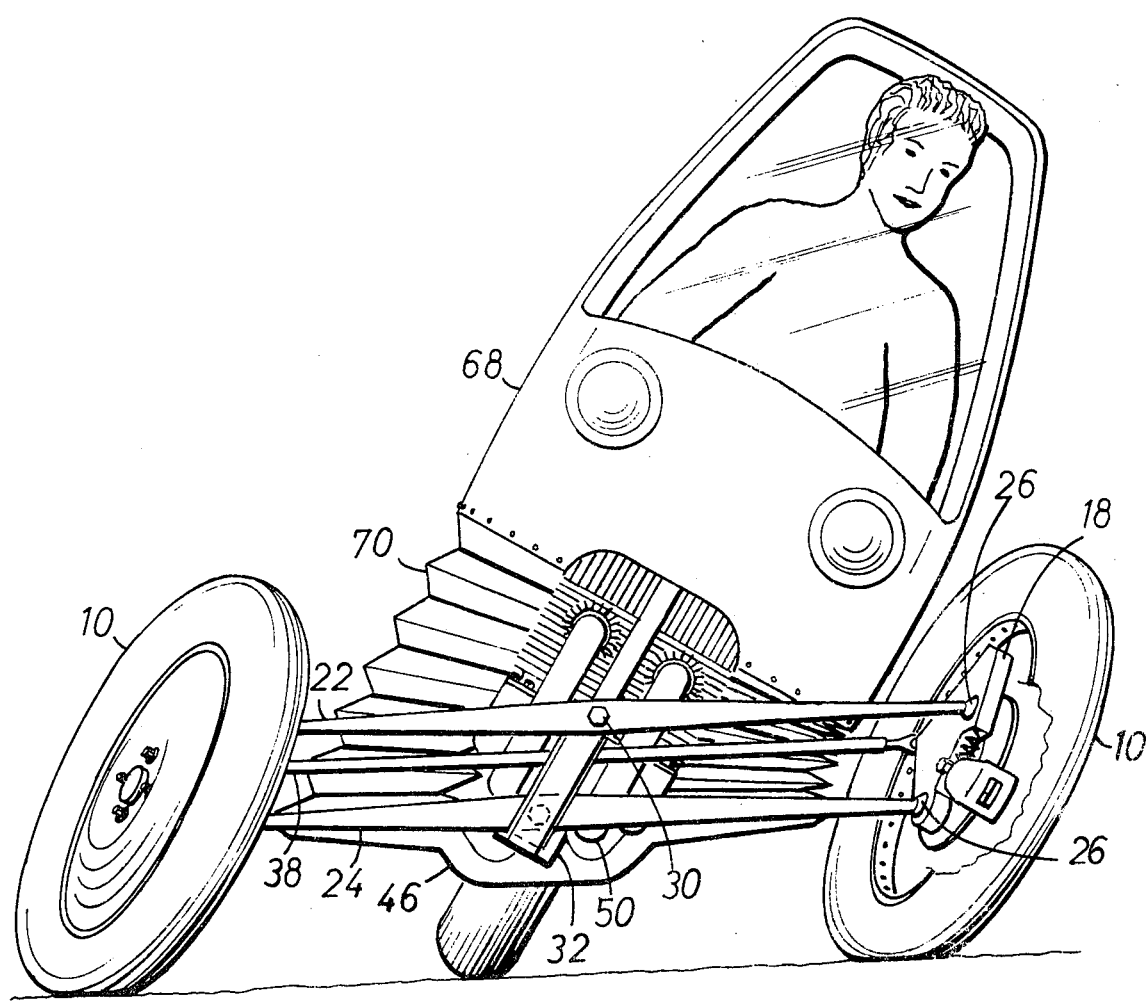
FIG. 1 is a front view of a vehicle constructed in accordance with this invention.
Figure 2:
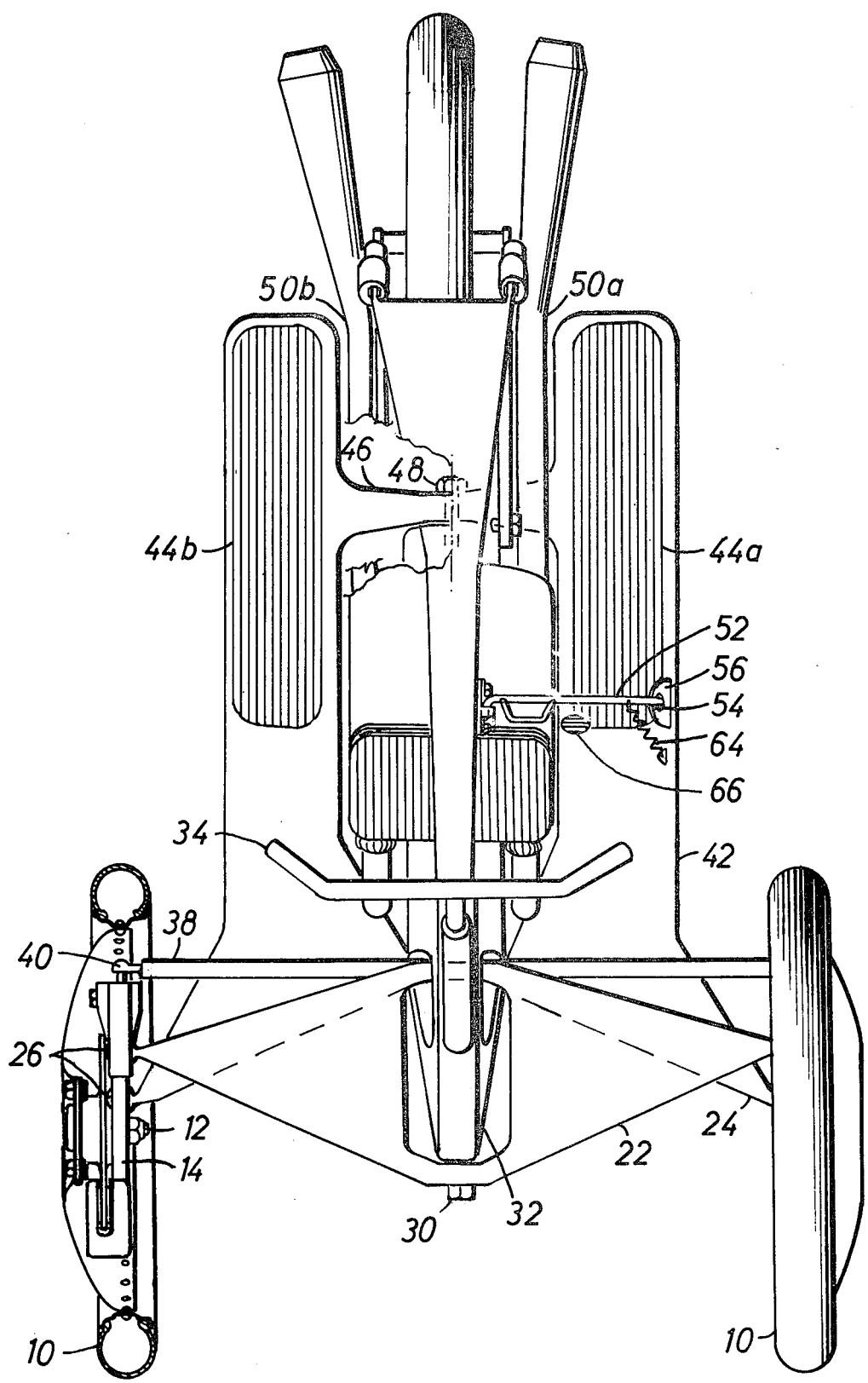
FIG. 2 is a top view of the vehicle shown in FIG. 1 with a portion of the upper structure of the vehicle removed.
Figure 3:
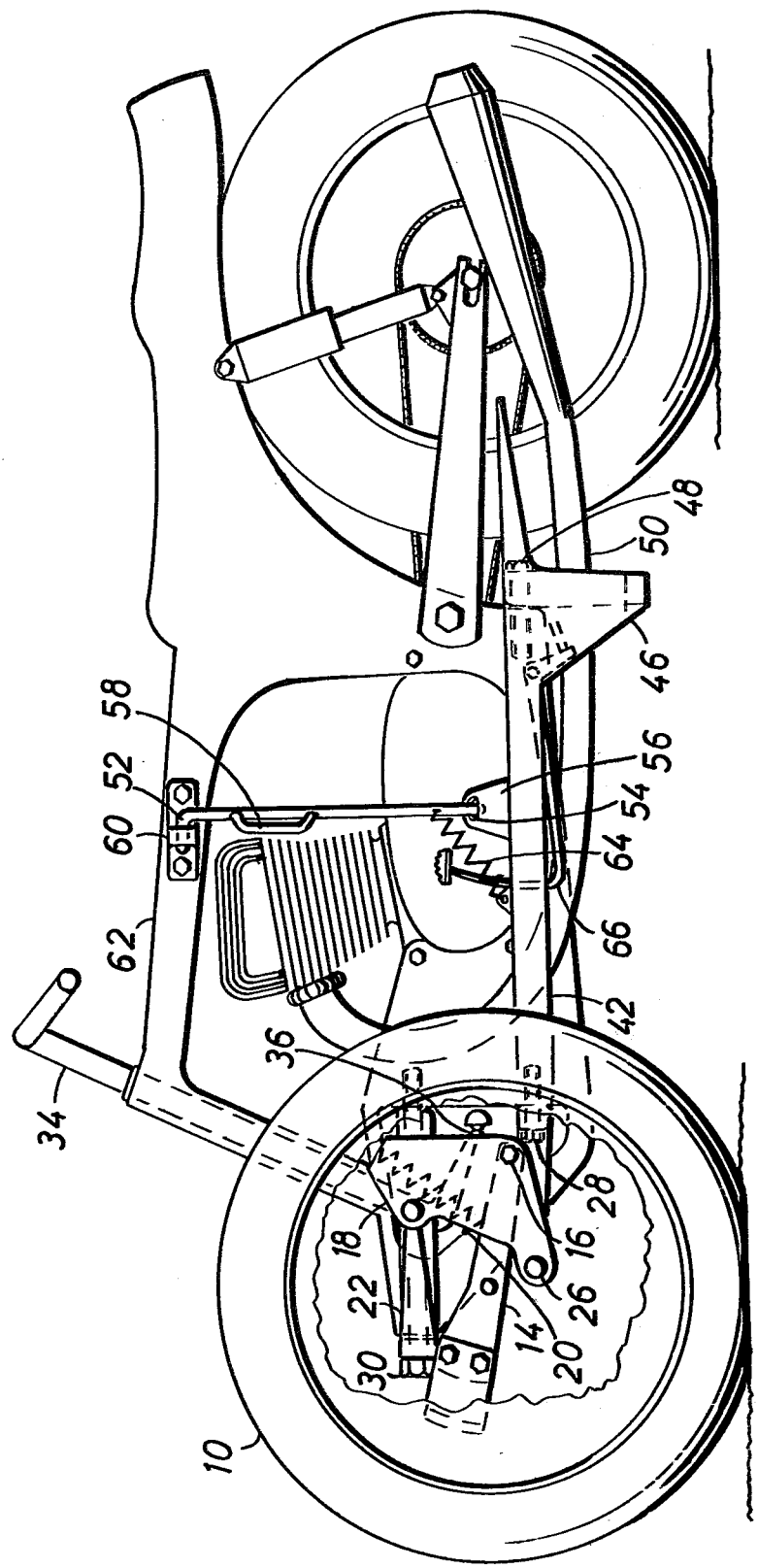
FIG. 3 is a partial side view of the vehicle shown in FIG. 1.

Referring to FIGS. 1-3, each of front wheels 10 is mounted on a hub or axle 12 (FIG. 3) on swing arms 14 supported by pivoting pin 16, in turn supported by wheel support 18. Wheel support 18 is of box construction and contains therein a shock absorbing spring 20 operating between a top region of wheel support 18 and swing arm 14. Wheel supports 18 are in turn supported by a parallelogram-type construction consisting of an upper cross member 22 and lower cross member 24. The outer ends of cross members 22 and 24 are connected by ball joints 26 to wheel supports 18 and are centrally connected by pivotal connections 28 and 30 to frame 32. Steering is accomplished by handlebar assembly 34 supported by frame 32 and including a radius rod 36 which operates tie rod 38, which in turn connects by ball joints 40 to the rear of wheel supports 18.

Lower cross member 24, in addition to functioning as one of the two cross members of a parallelogram, extends rearward to form platform 42 having a foot rest 44 on each side of the vehicle. The platform is supported in the front by pivotal connection 28 and at the rear by cross support region 46 connecting between foot rest 44 supporting pivotal connection 48 to frame 32. Cross support 46 first extends downward from each foot rest 44 under exhaust pipes 50 and then upward to pivotal connection 48, there being provided sufficient clearance so that foot rests 44 will clear the exhaust pipes in a fully banked position.

Figure 5:
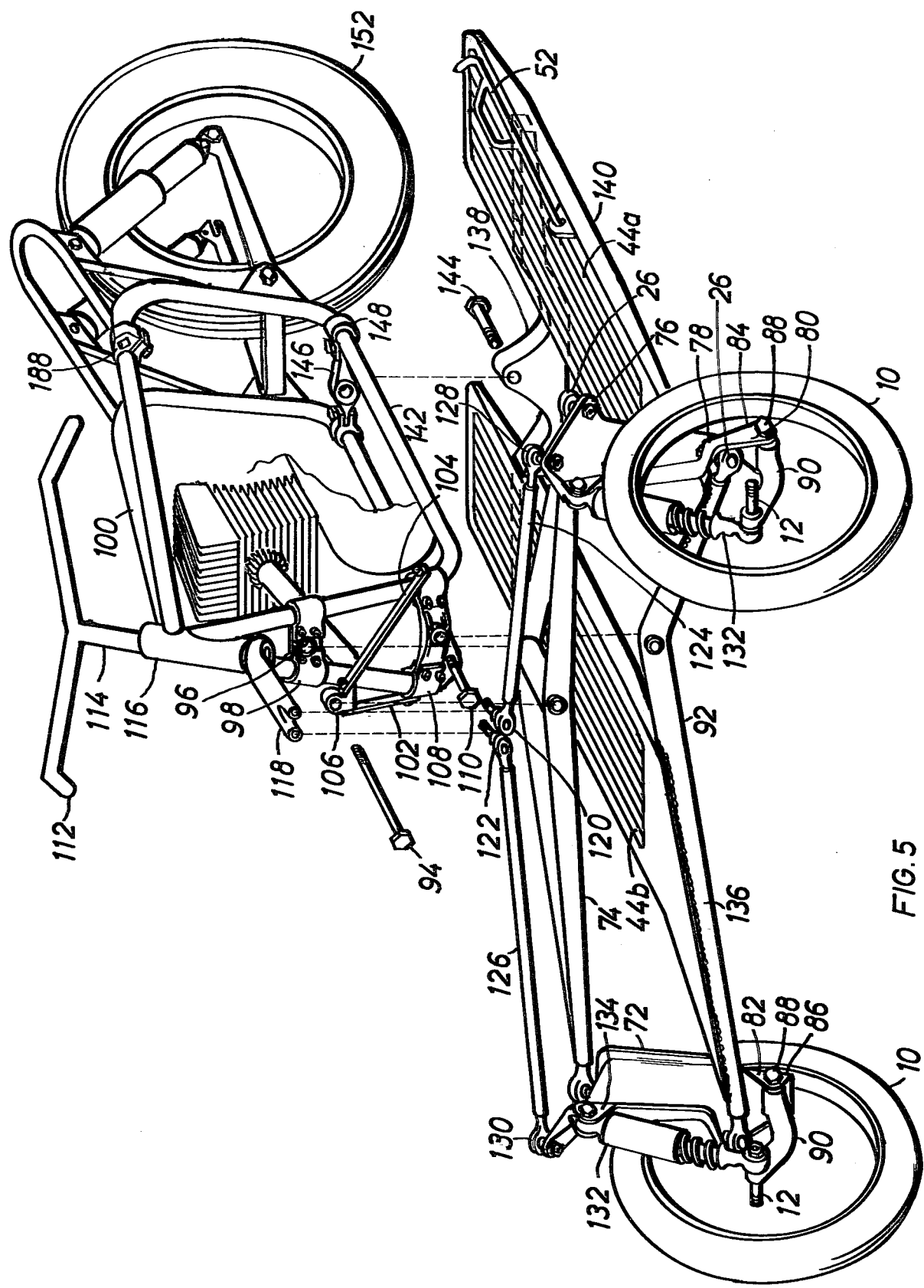
FIG. 5 is a partial perspective view of the vehicle shown in FIG. 4 with principal portions shown in exploded form to particularly illustrate the adaptation of a two-wheeled motorcycle to a three-wheeled motorcycle.

Locking bar 52 (shown in FIGS. 2 and 3) is pivotally supported to foot rest 44a by means of an opening 54 in bracket 56 attached to foot rest 44a. It is latchable by means of handle 58 in latch 60 attached to frame member 62. Spring 64 (FIGS. 2 and 3) biases locking bar 52 in either an upward (locked) or a downward and rearward (unlocked) position (FIG. 5). For maximum safety, the locking and unlocking functions should be performed while the vehicle is at a zero or near zero speed. In order to assure this, when locking bar 52 is in the locked position as shown in FIGS. 1, 2, and 3, it extends in front of gear shift pedal 66, and thus prevents operation of gear shift pedal 66 to start the motorcycle in motion. Alternately, the locking bar could be coupled to a parking brake, or latch 60 might contain an interlocking ignition switch which would only be turned "on" when locking bar 52 is disengaged from latch 60.

Full weather protection is provided for up to two riders as illustrated in FIG. 1 by housing 68. In order to accommodate banking operation of the vehicle, a pair of bellows 70, or other compliant material (one on each side), extends between housing 68, which is fixedly connected to frame 32 (by means not shown) and foot rests 44. As will be appreciated, the frame of the vehicle and the rider tilt as the rider commands, but the foot rests remain essentially parallel to the ground at all times, thus the need for the relative movement between housing 68 and foot rests 44.

FIGS. 4-7 illustrate an embodiment of the invention, particularly adapted to attach to a conventional motorcycle frame, with the front wheel removed to thus convert it to a three-wheeled vehicle. Front wheel supports 72 extend above wheels 10 as does cross member 74. Each of wheel supports 72 are generally of a U-shaped construction with turned-out top and bottom portions 76 and 78, respectively. In addition, there are flanges 80 and 82 which turn forward from the lower portion of edges 84 and 86. These flanges support pivotal support 88, which in turn supports the rear of swing arm 90. Upper cross member 74 is supported on top portion 76 of each of wheel supports 72 by ball joints 26. Lower cross member 92 is connected by ball joints 26 to the underside 78 of wheel supports 72. The center of cross member 74 is pivotally supported by pivotal connection 94 to forward bearing mount 96 by upper cross bracket 98 on frame 100; and two struts, 102 and 104 (FIGS. 4 and 5), provide additional support for pivotal connection 94 and bearing mount 96, being connected between bearing mount 106 and lower bracket 108 on frame 100. The center of lower cross member 92 is connected by pivotal connection 110 on lower bracket 108. Steering is effected by means of handlebars 112, turning steering column 114 in cylindrical collar 116, which in turn rotates radius rod 118 which connects through ball joints 120 and 122 to tie rods 124 and 126. The outer ends of tie rods 124 and 126 connect through ball joints 128 and 130 to a forward portion of the top portion 76 of wheel supports 72. Front wheels 10 are supported by axles 12, in turn supported by the forward ends of swing arm 90. Shock absorbers 132 are also supported at a lower end by axles 12 and are attached at an upper end to flange 134 extending forward from an upper inner forward side of wheel support 72.

Each of foot rests 44 is an integral part of, and extends rearward from, a region 136 of cross member 92 and is thus supported in the front of the vehicle as described for cross member 24 of FIG. 1. As shown in FIGS. 5 and 6, a rear portion 138 of platform 140 extends between foot rests 44 extending under frame tubes 142 and centrally upward where attachment is made by pivotal support 144 to a cross bracket 146, in turn connected by clamps 148 to frame tubes 142. As shown in FIG. 6, locking bar 52 on foot rest 44 includes a plate 150 which particularly locks access to gear shift pedal 66 when locking bar 52 is in an upright (locked) mode. Pivotal support 144, which is just forward of rear wheel 152 of the vehicle (FIG. 5), enables relative movement between platform 140 and frame 100 and is located where a motorcycle stand (unnecessary and removed for purposes of this invention) would normally be located.

Figure 4:
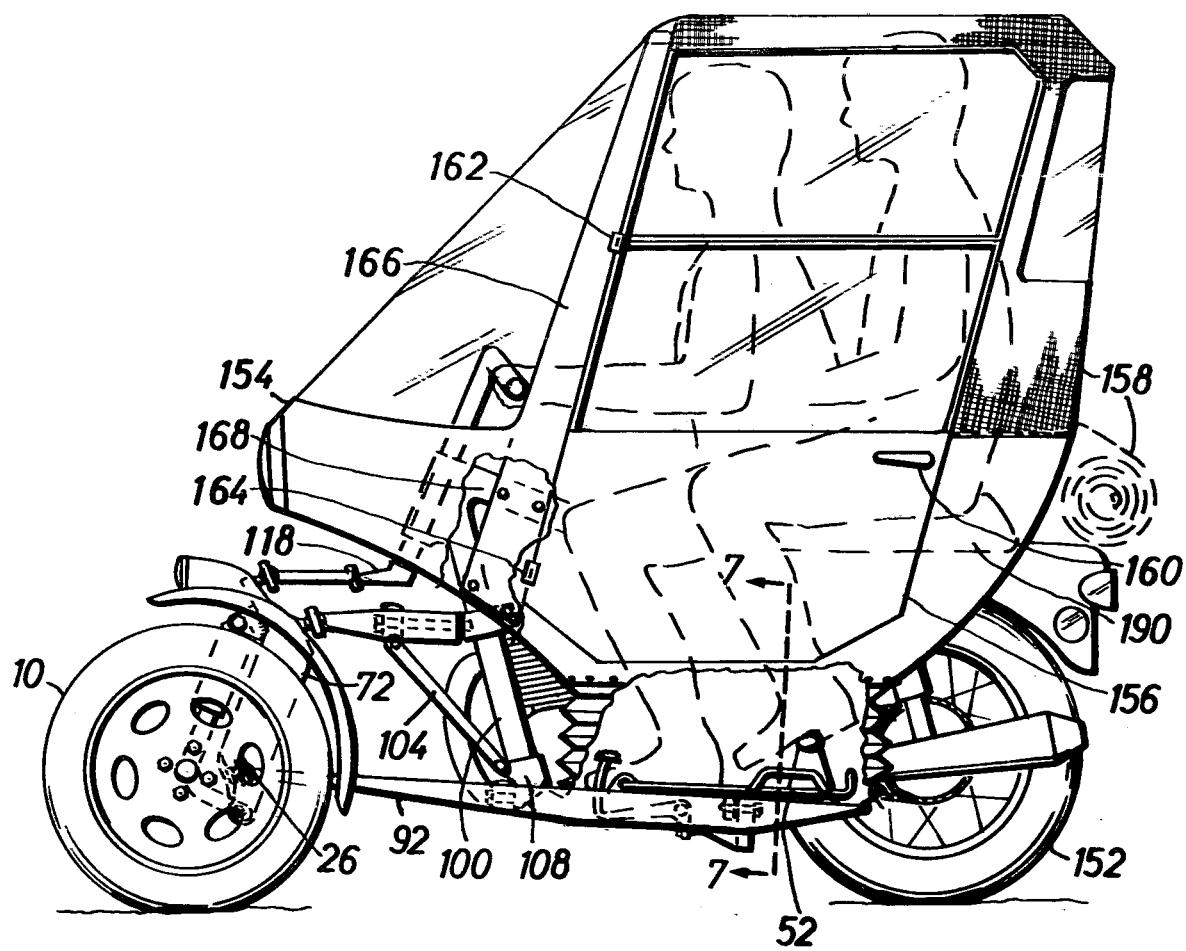
FIG. 4 is a side view of an alternate embodiment of the invention particularly adapted to convert a conventional two-wheeled motorcycle to a threewheeled motorcycle.

As shown in FIG. 4, this embodiment of the invention would also include a passenger enclosure 154, and preferably elements of the enclosure such as door 156 and/or roof 158 (depicted in a down or "open" position by dashed lines) would be readily removable and/or openable. Door 156 would typically be operated by handle 160, in turn pivoted about hinges 162 and 164. To enhance safety, a roll bar 166 would be attached from one side 168 of frame 100 to the other side (not shown).

FIG. 7 illustrates an alternate form of rear pivot for platform 140. Compared with the pivotal mount shown in FIG. 6, somewhat more ground clearance is achieved during banking operation. The lower portion 170 of platform 140 is essentially flat and is connected to frame 100 by means of pliable straps 172 and 174, strap 172 being secured to the left side of platform 140 by bolt 176 and being connected to the right side of frame 100 by clamp 178, and member 174 being connected by bolt 180 to the right side of platform 140 and crossing strap 172 and connecting to the left side of frame 100 by means of clamp 182. Dashed lines 184 illustrate a condition of banking to the right wherein the left side of member 174 rises, and dash-dotted lines 186 illustrate a condition of banking to the left wherein the right side of member 172 rises.

To effect conversion of a conventional motorcycle into a three-wheeled safety vehicle as contemplated by the present invention, the following six steps would be performed:

1. The motorcycle's front wheel, front fork, front fender, foot rests, and stand are removed.
2. Upper bracket 98, lower bracket 108, and rear bracket 146 or clamps 148 are clamped to main frame 100.
3. Radius rod 118 is attached to the lower end of steering column 114.
4. Locking latch 188 is attached to the upper section of frame 100.
5. Platform and foot rest assembly 140, including locking bar 52, upper cross member 74, axles 12, swing arms 90, front wheels 10, tie rods 124 and 126, and enclosure 154 are installed.
6. Foot control, such as a brake pedal and gear shift pedal 66, is relocated on platform and foot rests 44.

Figure 8:
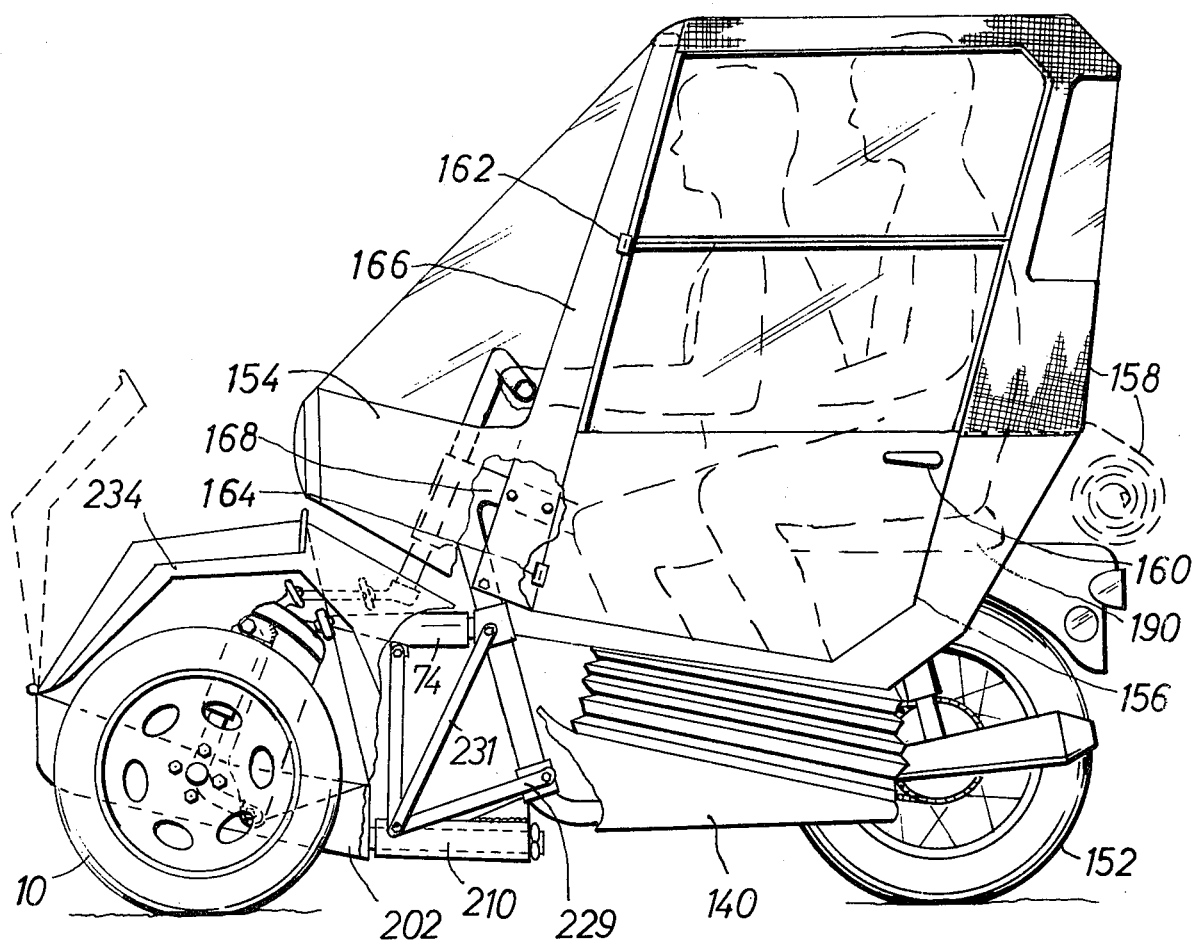
FIG. 8 is a side view of an alternate embodiment of the invention including a front storage compartment between the front wheels.
Figure 9:
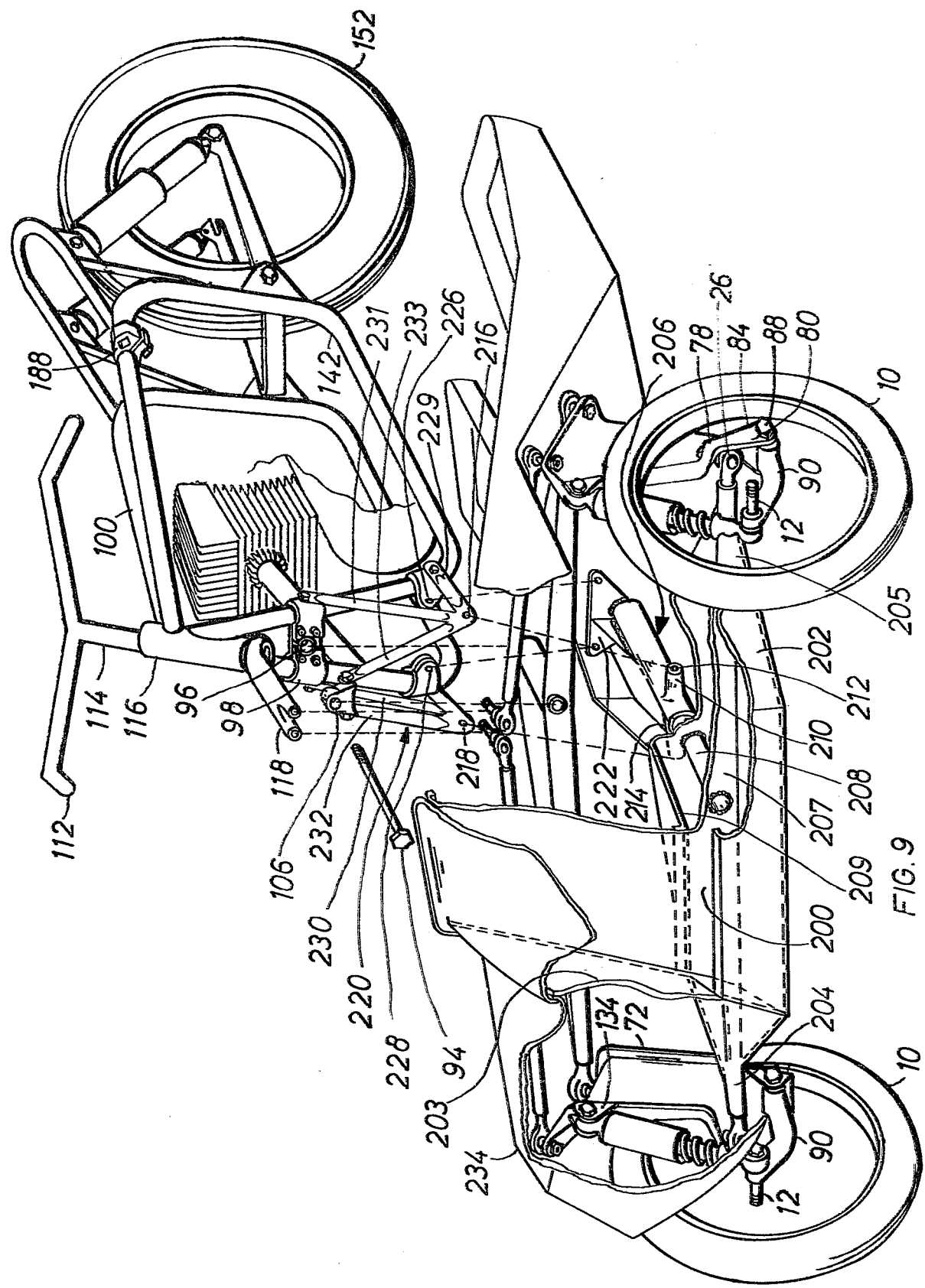
FIG. 9 is a partial perspective view of the vehicle shown in FIG. 8 with principal portions shown in exploded form to particularly illustrate the adaptation of a two-wheeled motorcycle to a three-wheeled motorcycle, and wherein a portion of the front compartment is broken away, illustrating a modified lower cross member, which in this form of the invention additionally functions as a frame to support the compartment.

The embodiment of the invention in FIGS. 8 and 9 generally follows the illustrations of FIGS. 4 and 5, but illustrate the addition of a front storage compartment 200 and a modified lower cross member 202 particularly configured to support it. The lower cross member 202 is integral with and centrally formed of the wall or housing 203 of compartment 200, this housing typically being of sheet metal. Stub supports 204 and 205 connect, respectively, between a side of housing 203 and a ball joint 26. Housing 203 and the integral lower cross member 202 are connected to frame 100 through a cantilevered support assembly 206 which includes shaft support frame 207 attached to the rear of housing 203. A rearwardly extending support shaft 208 is then affixed to frame 207 and a frame member 209 forming a portion of the rear wall of housing 203. Shaft 208 then extends into and is rotably supported by bearing mounting assembly 210. Mounting assembly 210 includes side mounting arms 212 and 214 which are supported by bolts (not shown) on end openings 216 and 218 of a fork strut assembly 220. This strut assembly consists of strut arms 228–233 connected to and mounting the strut assembly on frame 100. Bearing mounting assembly 210 further includes rear support 222 which is bolted to openings 224 and 226 in struts 228 and 229 to provide additional support. Front fenders 234 are provided, and these attach, respectively, to the left and right sides of compartment 200 and extend outward to the side and to the rear where they each join and provide additional support for a discrete one of platforms 140. Compartment 200 is openable from the front, as shown in dashed lines in FIG. 8, and it is latched and unlatched by a conventional latching means (not shown).

The conversion of a conventional motorcycle into the embodiment of the present invention illustrated in FIGS. 8 and 9 is identical to that for the conversion of a vehicle illustrated in FIGS. 4–7, except as follows:

1. It is not necessary to remove a stand.
2. There is no rear bracket or clamps to be clamped to the main frame.
3. Struts 228–233 and lower bearing mounting assembly 210 are installed.

To operate the vehicle, a rider enters the vehicle through door 156, takes his position on seat 190, disengages locking bar 52 from latch 188, starts the engine, and rides the vehicle in motorcycle fashion by coordinated steering and load shifting maneuvers. At low speeds and in emergency situations, he can gain additional stabilizing support from his legs which are planted on horizontal platform and foot rest assembly 140. Typically, two front brakes serve as main operating brakes (a rear brake is also used), wherein hydraulic lines and actuators are preferred embodiments for uniform distribution of braking force and reduced risk of skidding. Compared with conventional motorcycles, safety for the rider or riders is greatly enhanced because of the following features:

1. there is accomplished three contacts with the ground, and this enables three brakes which significantly reduce the risk of skidding of the most critical front in an emergency braking, turn maneuvers, or on slippery roads.
2. Provisions are made for each rider of the vehicle to plant his feet on a platform and foot rest assembly for positive control of bank angle at all speeds which enables a differential force to be applied between the frame and platform and foot rest assembly 140 for accelerated lateral shifting of loads or banking angle corrections in critical situations.
3. The vehicle is structurally strong and employs a wide front end with an extremely stable mounting structure which provides enhanced safety against front-end collisions, and importantly, provides a feeling of stability and security.
4. The passenger housing may employ a U-shaped structural member around it for substantial protection of passengers in the event of an accident.
5. Further, the housing provides cool weather protection and eliminates direct wind loads on the body of a rider, which reduces fatigue and noise and enhances alertness.
6. A compartment for luggage, tools, etc. is provided in front of the vehicle without taking away from the vehicle any needed space for the occupant or occupants.

From the foregoing, it will be appreciated that the present invention significantly contributes to increased safety for small motorcycle-type vehicles and provides an increased sense of security for the occupants. By virtue of these factors, it is believed that this invention will go far in effecting acceptance of the motorcycle as a commuter-type vehicle, resulting in a much needed reduction in fuel consumption. In addition, by virtue of a reduction in size and horsepower, the vehicle of this invention will make possible a reduction in street noise, air pollution, and the need for parking space. Significantly, the advantages provided by this invention are achievable without the loss of riding satisfaction to the genuine motorcycle enthusiast while obtaining enhanced riding comfort for riders and passengers in general.

What is claimed is:

1. In combination with a motorcycle-type frame, engine, and rear drive wheel configuration, the improvement comprising:
   first and second spaced front wheels, each having a wheel mounting support;
   parallelogram coupling means comprising first and second, spaced one above the other, cross members pivotally interconnected between said wheel mounting supports of said front wheels, and each cross member being centrally and pivotally attached to said frame;
   a foot resting platform extending rearward from the lower of said cross members on each side of and spaced from the lower portion of said frame; and
   steering means pivotally supported by said frame, and including means pivotally connected to said wheel mounting supports of said front wheels for rotating said wheel mounting supports and said front wheels in unison about axes perpendicular to the spin axes of the wheels;
   whereby a rider may apply a stabilizing force between the frame and front wheels for holding the vehicle upright while stopped and while operating at low speeds without contacting the ground, and by leaning and applying a force by one of his feet to a portion of the platform on one side of the vehicle, the rider may effect a banking operation wherein the planes of all three wheels of the vehicle are essentially parallel, and said platform remains essentially parallel to the ground at all times.

2. The combination as set forth in claim 1 further comprising locking means selectively connectible between said platform and said frame for holding said frame in an essentially upright locked position with respect to said platform.

3. The combination as set forth in claim 2 further comprising a passenger enclosure supported by said frame, and including flexible enclosure means interconnecting a lower portion of the enclosure to said platform.

4. The combination as set forth in claim 3 wherein said enclosure includes a stiffened frame region extending upward from said frame and laterally across said enclosure, whereby said enclosure would resist deformation in the event the vehicle should roll during an accident.

5. The combination as set forth in claim 3 including operating means for commencing operation of said rear driven wheel, and said locking means includes means for preventing operation of said operating means when in a locked position.

6. The combination as set forth in claim 3 wherein said enclosure includes at least one door on one side of said enclosure.

7. The combination as set forth in claim 3 including means for selectively removing at least a portion of said enclosure.

8. The combination as set forth in claim 1 further comprising a compartment positioned between said first and second spaced front wheels and attached to the lower of said cross members.

9. The combination as set forth in claim 8 wherein said compartment and said lower of said cross members are of integral construction.

10. The combination as set forth in claim 8 further comprising a first front fender positioned over one of said front wheels and attached between a side of said compartment and said foot resting platform on one side of said frame, and a second fender over the opposite of said front wheels and attached between an opposite side of said compartment and said foot resting platform on the opposite side of said frame, and thereby providing additional support for said platforms.

11. An assembly for converting a two-wheeled type motorcycle with the front wheel removed to a three-wheeled vehicle, and employing in particular the original frame, engine, and rear driven wheel, said assembly comprising:

first and second spaced front wheels, each having a mounting support;

parallelogram coupling means comprising first and second spaced, one above the other, cross members pivotally interconnected between said mounting supports of said front wheels, and each cross member being adapted to be centrally and pivotally attached to said frame;

a foot resting platform extending rearward from the lower of said cross members and adapted to extend along on each side of and be spaced from said frame; and steering means adapted to be pivotally supported by the frame, and including means for pivotally connecting to said mounting supports of said front wheels for rotating said mounting supports and said front wheels in unison about axes perpendicular to the spin axes of the front wheels;

whereby a rider of the vehicle may apply a stabilizing force between the frame and front wheels for holding the vehicle upright while stopped and while operating at low speeds without contacting the ground, and by leaning and applying a force by one of his feet to a portion of the platform on one side of the vehicle, the rider may effect a banking operation wherein the planes of all three wheels of the vehicle are essentially parallel, and said platform remains essentially parallel to the ground at all times.

12. The combination as set forth in claim 11 further comprising a compartment positioned between said first and second spaced front wheels and attached to the lower of said cross members.

13. The combination as set forth in claim 12 wherein said compartment and said lower of said cross members are of integral construction.

14. The combination as set forth in claim 11 further comprising a first front fender positioned over one of said front wheels and attached between a side of said compartment and said foot resting platform on one side of said frame, and a second fender over the opposite of said front wheels and attached between an opposite side of said compartment and said foot resting platform on the opposite side of said frame.

* * * * *